(12) United States Patent
Pilutti et al.

(10) Patent No.: US 9,020,732 B2
(45) Date of Patent: Apr. 28, 2015

(54) VEHICLE AND POWERTRAIN CONTROL BASED ON REARWARD APPROACHING OBJECT

(75) Inventors: Thomas Edward Pilutti, Ann Arbor, MI (US); Peter Gyumyeong Joh, Bloomfield Hills, MI (US); Matthew Y. Rupp, Canton, MI (US); Dorian Jack Spero, Farmington Hills, MI (US); Aaron L. Mills, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 565 days.

(21) Appl. No.: 12/985,087

(22) Filed: Jan. 5, 2011

(65) Prior Publication Data

US 2012/0173113 A1    Jul. 5, 2012

(51) Int. Cl.
| | |
|---|---|
| B60W 30/14 | (2006.01) |
| G01S 19/42 | (2010.01) |
| B60W 10/18 | (2012.01) |
| B60W 30/09 | (2012.01) |
| B60W 30/095 | (2012.01) |

(52) U.S. Cl.
CPC ........... *B60W 30/09* (2013.01); *B60W 30/0953* (2013.01); *B60W 30/0956* (2013.01); *B60W 2550/30* (2013.01); *B60W 2550/308* (2013.01)

(58) Field of Classification Search
USPC ............... 701/93, 96, 301; 340/903; 180/169, 180/170, 179, 271; 342/455
See application file for complete search history.

(56) References Cited

U.S. PATENT DOCUMENTS

| | | | |
|---|---|---|---|
| 6,081,762 A | 6/2000 | Richardson et al. | |
| 6,233,515 B1 | 5/2001 | Engelman et al. | |
| 6,301,542 B1 | 10/2001 | Kirchberger et al. | |
| 2011/0276216 A1* | 11/2011 | Vaughan | 701/29 |

FOREIGN PATENT DOCUMENTS

GB        2401956 A        11/2004

* cited by examiner

*Primary Examiner* — Adam Tissot
(74) *Attorney, Agent, or Firm* — Frank A. MacKenzie; Brooks Kushman P.C.

(57) ABSTRACT

A vehicle may include a sensor configured to detect a rearward approaching object and at least one controller configured to cause the vehicle to accelerate in response to the sensor detecting a rearward approaching object while the vehicle is moving forward.

7 Claims, 1 Drawing Sheet

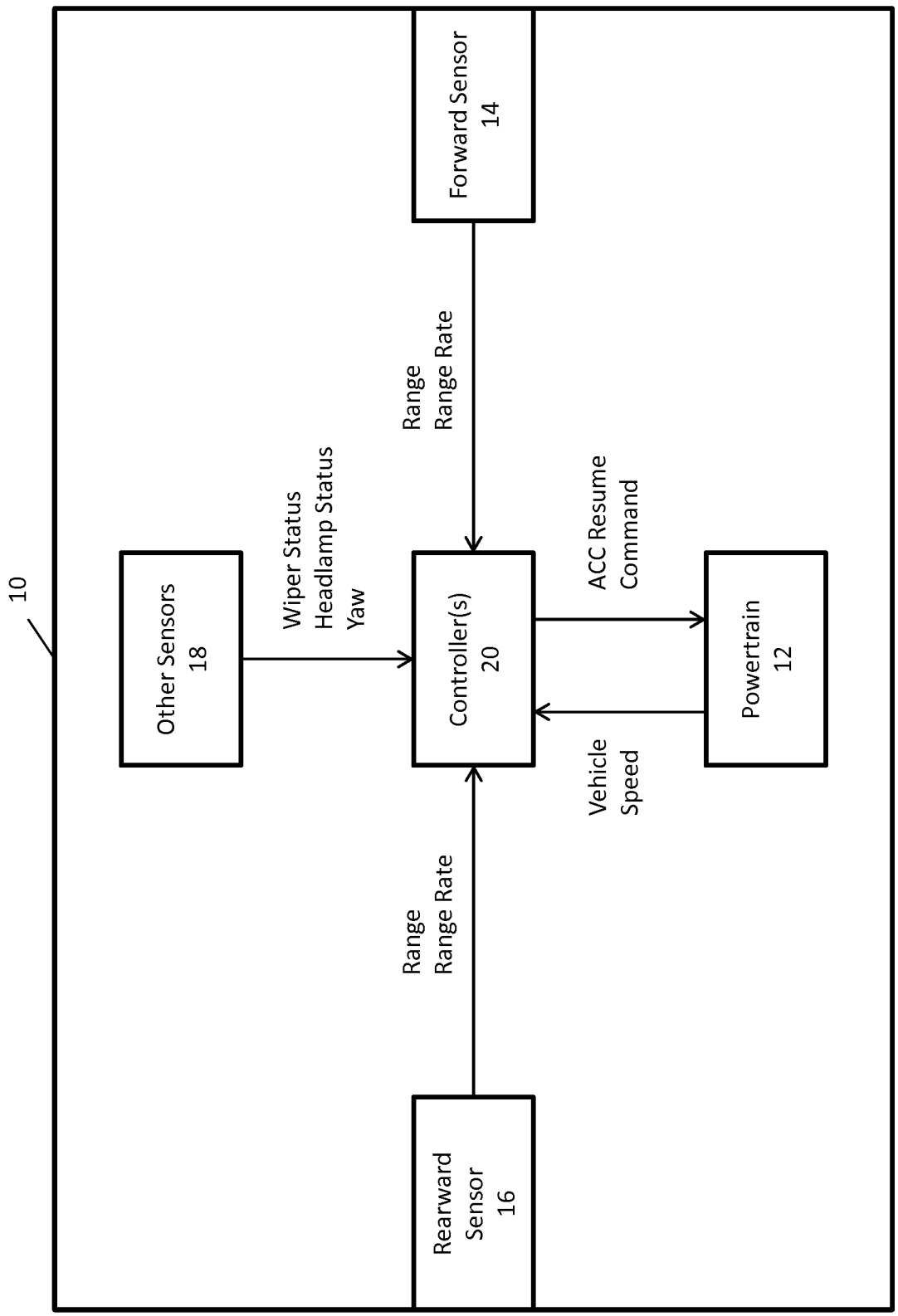

VEHICLE AND POWERTRAIN CONTROL BASED ON REARWARD APPROACHING OBJECT

BACKGROUND

Cruise control (sometimes known as speed control or autocruise) is a feature that may automatically control the speed of a motor vehicle. Cruise control systems control throttle to maintain a steady speed as set by the driver.

SUMMARY

An automotive vehicle may include a powertrain and at least one controller configured to command the powertrain to accelerate the vehicle in response to information about an object approaching the vehicle from the rear if a speed of the vehicle is less than a target cruise control speed.

BRIEF DESCRIPTION OF THE DRAWINGS

FIG. 1 is a block diagram of an automotive vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Certain vehicles have adaptive cruise control (ACC) systems, which may improve cruise control functionality via automatic braking or dynamic set-speed controls. Automatic braking controls may use, for example, a radar or lidar arrangement to allow the vehicle to keep pace with the car it is following, slow when closing in on the vehicle in front, and accelerate again to the preset speed when traffic allows (referred to herein as ACC resume acceleration). The ACC resume acceleration may, for example, be based on vehicle type, whether it is raining (as determined, for example, based on information from a windshield wiper sensor), whether it is nighttime (as determined, for example, based on information from a headlamp sensor), whether the vehicle is cornering (as determined, for example, based on information from a steering angle sensor or yaw rate sensor), and/or whether a turn indicator is active. Dynamic set-speed controls may use the GPS position of the vehicle and a map database with speed limit information or information from speed limit signs to adjust the cruise set-speed accordingly.

A driver of an active ACC vehicle may choose to change lanes after automatically being slowed (from 65 mph to 45 mph for example) to pass a vehicle that it had been closing in on. Once in the new lane, the ACC system may then cause the vehicle to accelerate until the preset speed (65 mph in this example) is reached. The ACC resume acceleration, as discussed above, may be based on vehicle type and/or driving conditions. These factors may result, for example, in a nominal acceleration of approximately 1 m/sec². If another vehicle (travelling at 65 mph for example) closes in on the vehicle with active ACC too quickly from behind (because the acceleration of 1 m/sec² set by the ACC is not sufficient to keep the vehicles adequately spaced apart), the driver of the vehicle with active ACC may need to intervene by stepping on the accelerator pedal to increase the acceleration of the vehicle. This may cause driver dissatisfaction with the ACC system. Hence, embodiments contemplated herein may consider, for example, the speed of an object approaching from the rear in determining the ACC resume command.

Referring to FIG. 1, an automotive vehicle 10 may include a powertrain 12 (e.g., engine, transmission, brakes, etc.), a forward sensor 14 (e.g., radar, lidar, camera, etc.), a rearward sensor 16 (e.g., radar, lidar, camera, etc.), a plurality of other vehicle sensors 18 (e.g., wiper sensor, headlamp status sensor, steering wheel sensor, etc.) and one or more controllers 20. The sensors 14, 16, 18 are in communication with the controllers 20. (Other sensor arrangements are, of course, also contemplated.) The powertrain 12 is in communication with/under the control of the controllers 20.

The forward sensor 14 may detect the distance or range to (and/or the velocity/acceleration/range rate of) another vehicle in front of the vehicle 10. Likewise, the rearward sensor 16 may detect the distance or range to (and/or the velocity/acceleration/range rate of) another object/vehicle behind the vehicle 10. The sensors 18 may detect a variety of information regarding the operating state of the vehicle 10 (such as whether the headlamps are on, whether the windshield wipers are on, the steering angle at any given instant, etc.) and the ambient conditions (e.g., temperature, humidity, etc.) in the vicinity of the vehicle 10.

As discussed above, information from the sensors 14, 18 may be used to determine, in a known fashion, an ACC resume acceleration. This ACC resume acceleration, however, may not be sufficient to keep the vehicle 10 adequately spaced apart from another object approaching from its rear. Hence, information from the sensor 16, as discussed below, may be used by the controllers 20 to modify/determine the ACC resume acceleration.

To maintain at least a timed headway distance, $T_r$ (sec), to a rearward approaching vehicle, the required vehicle acceleration, $a_h$, may be found from the relations $$\min_t d_r(t) = \min_t \left( \int_0^t (v_h + a_h \cdot \tau) d\tau + d_{r0} - v_r \cdot t \right) \geq v_r \cdot T_r, t \geq 0$$

where
$d_r(t)$=distance to the rear vehicle, $d_{r0}$=distance to the rear vehicle at lane change,
$v_r$=rear vehicle speed at lane change, $T_r$=rear vehicle's headway time (sec) (tunable),
$v_h$=host vehicle speed at lane change, $a_h$=host vehicle acceleration, and assuming $d_{r0} > v_r \cdot T_r$, and $v_r \geq v_h$
Hence, $a_h$ should be greater than or equal to $$\frac{(v_r - v_h)^2}{2(d_{r0} - v_r \cdot T_r)}$$

$T_r$ is given, $v_r$ and $d_{r0}$ are determined in a known fashion or obtained from the sensor 16, and $v_h$ is known. The controllers 20 may solve for $a_h$ and compare this acceleration with the ACC resume acceleration determined based on information from the sensors 14, 18. The controllers 20 may then apply the maximum of these accelerations.

A look-up table accessible by the controllers 20 and populated with parameters such as those discussed above (or other suitable parameters) may be mapped with various ACC resume acceleration values. As an example, inputs to the look-up table may include approaching vehicle speed, wiper status, yaw rate, etc. A nominal ACC resume acceleration may thus be identified based on the values of the input parameters. As another example, inputs to the look-up table may include those parameters identified in the paragraph above. Hence, $a_h$ need not be solved for but rather selected based on the values of the input parameters.

The ACC resume acceleration determined from the information from the sensors 14, 18 may be modified by a gain factor that depends on, for example, a speed of (and/or the distance to, etc.) the rearward approaching vehicle. If, for example, the controllers 20 determine a nominal ACC resume acceleration of 1.3 m/s$^2$ via a look-up table based on information from the sensors 14, 18, the controllers 20 may then modify (e.g., multiply) this ACC resume acceleration by a factor (generally greater than 1) that depends on approaching vehicle speed. This factor may be equal to, for example, 1.3 if the approaching vehicle speed is 50 mph, and may be equal to, for example, 1.7 if the approaching vehicle speed is 70 mph, etc. The gain factor may also be fixed. Other scenarios and modification strategies are also contemplated.

Alternatively, the controllers 20 may assign a value to a parameter (e.g. a flag) representing whether the sensor 16 detects a reward approaching vehicle. That is, if the sensor 16 detects a rearward approaching vehicle, the controllers 20 set the flag to "1." Otherwise, the controllers 20 set the flag to "0." The controllers 20 may command the powertrain 12 to accelerate the vehicle 10 if the controllers 20 determine the flag to be "1" and the speed of vehicle 10 to be less than the cruise speed set point. The acceleration rate may simply be a fixed value or determined based on factors and techniques similar to those described above.

In addition, a turn indicator may be used to trigger an increase in the acceleration request. This acceleration request may be scaled as a function of rear vehicle speed, distance and/or acceleration. A more complex algorithm may use turn signal application to activate this feature, which then scales the acceleration gain as a function of offset relative to the lead vehicle and/or lane markings. An example sequence may be as follows: (1) driver applies left turn signal=>acceleration request=0.1·$a_h$; (2) driver turns wheel and vehicle begins to change lanes to pass=>acceleration request=$a_h$·lead vehicle lateral offset·scaling factor; (3) lead vehicle is fully out of path=>acceleration request=$a_h$; (4) if the host vehicle does not change lanes within a specified timeout period or the range to the lead vehicle is too small=>acceleration request=acceleration necessary to follow lead vehicle.

The ACC resume acceleration (or acceleration rate) may be bounded by a maximum threshold value. This value may be fixed (e.g., 2 m/s$^2$) or depend on information from the sensors 14, 18 or other data sources. As an example, the controllers 20 may calculate/identify $a_h$, as described above, to be 2.3 m/s$^2$. Such a rate of acceleration may be precluded and instead limited to 1.9 m/s$^2$ if, for example, the sensor 14 detects another vehicle 50 m away.

Suitable/known vehicle communications technology may be used to acquire information on approaching vehicles. Hence, sensors need not be used to obtain information regarding approaching vehicles. A host vehicle, for example, may receive speed and/or location information from a rearward approaching vehicle. Based on this (as well as other information similarly received), the controllers 20 may determine/identify a suitable ACC resume acceleration as described herein. Other arrangements are also possible.

The controllers 20 may periodically/continuously monitor the speed of the vehicle 10 versus the cruise speed set point to determine when to discontinue the ACC resume acceleration. That is, when the speed of the vehicle 10 meets or exceeds the cruise speed set point, the controllers 20 cease to issue the ACC resume acceleration command as known in the art.

The controllers 20 may instead use torque and/or speed commands to cause the vehicle 10 to accelerate during ACC resume. That is, one of ordinary skill will recognize that there are kinematic equivalent techniques to those described above to represent the change in vehicle speed necessary to achieve the cruise speed set point. As an example, a look-up table may map various input parameters with an ACC resume engine (or wheel) torque instead of an ACC resume acceleration, etc.

The algorithms disclosed herein may be deliverable to/implemented by a processing device, such as the controllers 20, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a sensor configured to detect a rearward approaching object; and
    at least one controller configured to, in response to the vehicle moving at a speed less than a target speed and the sensor detecting the rearward approaching object, cause the vehicle to accelerate at a target acceleration selected based on a predefined timed headway such that the vehicle maintains at least the timed headway ahead of the rearward approaching object.

2. The vehicle of claim 1 wherein the sensor is further configured to detect at least one of a distance to the rearward approaching object, a speed of the rearward approaching object, and an acceleration of the rearward approaching object and wherein the target acceleration is selected further based on the distance to the rearward approaching object, the speed of the rearward approaching object or the acceleration of the rearward approaching object.

3. The vehicle of claim 1 wherein the object is another vehicle.

4. An automotive vehicle comprising:
    a powertrain; and
    at least one controller configured to, in response to the vehicle moving at a speed less than a target speed and to a rearward object approaching the vehicle, operate the powertrain to cause the vehicle to accelerate at a target acceleration selected based on a predefined timed headway such that the vehicle maintains at least the timed headway ahead of the object.

5. The vehicle of claim 4 further comprising a sensor in communication with the at least one controller and configured to detect the rearward object.

6. The vehicle of claim 5 wherein the sensor is further configured to detect at least one of a distance to the rearward object, a speed of the rearward object, and an acceleration of the rearward object and wherein the target acceleration is selected further based on the distance to the rearward object, the speed of the rearward object or the acceleration of the rearward object.

7. A method for controlling a powertrain of a vehicle comprising:
  in response to the vehicle moving at a speed less than a target speed and to detecting a rearward approaching object, causing by a processor the powertrain to accelerate such that the vehicle accelerates at a target acceleration selected based on a predefined timed headway and the vehicle maintains at least the timed headway ahead of the object.

* * * * *